United States Patent [19]
Kerber

[11] Patent Number: 4,484,537
[45] Date of Patent: Nov. 27, 1984

[54] GRAVITY FEED AND RETURN SYSTEM FOR SHEET LUBRICATORS

[75] Inventor: Robert Kerber, Park Ridge, Ill.

[73] Assignee: Briskin Manufacturing Company, Chicago, Ill.

[21] Appl. No.: 570,820

[22] Filed: Jan. 16, 1984

[51] Int. Cl.³ .................. B05C 1/02; B05C 13/00
[52] U.S. Cl. ........................... 118/686; 118/236; 118/249
[58] Field of Search ............ 118/686, 687, 236, 249; 271/DIG. 9, 302, 3; 198/592; 193/36

[56] References Cited
U.S. PATENT DOCUMENTS
499,460  6/1893  Hooper ..................... 198/592 X
2,306,777 12/1942 Buzonik ................... 118/236 X
3,392,813  7/1968 Trautmann ................... 193/36

*Primary Examiner*—John P. McIntosh
*Attorney, Agent, or Firm*—David D. Kaufman

[57] ABSTRACT

A gravity feed and return conveyor system which may be detachably connected to a conventional metal sheet lubricator so that a single worker at a stationary station can place a sheet on the system and remove the lubricated sheet therefrom. There are three conveyor sections, the middle one acting to reverse the direction of transport of the sheet. Positive acting means are provided for effectuating the direction reversal and electrical switch means are provided for actuating the direction reversal means as well as additional safety features.

13 Claims, 4 Drawing Figures

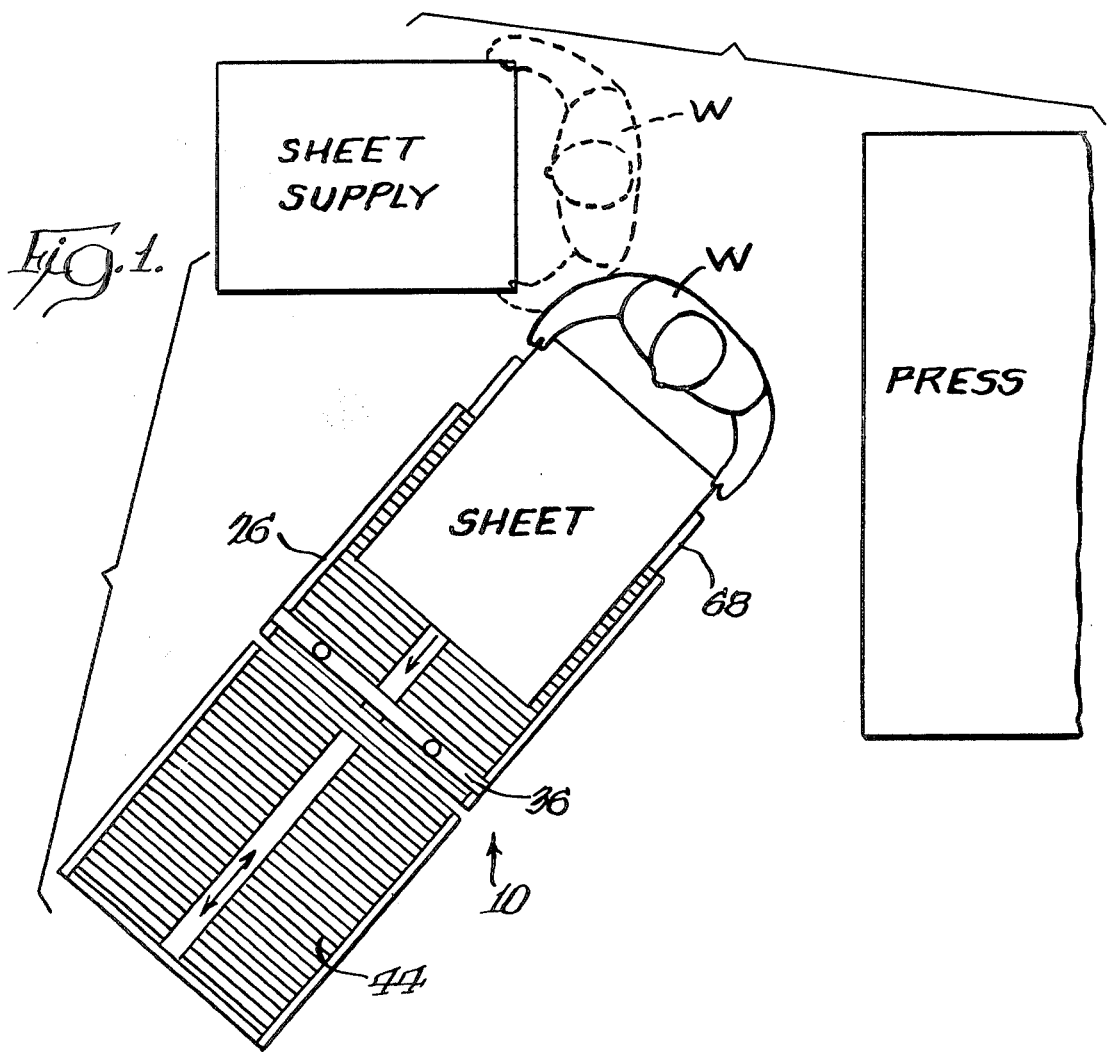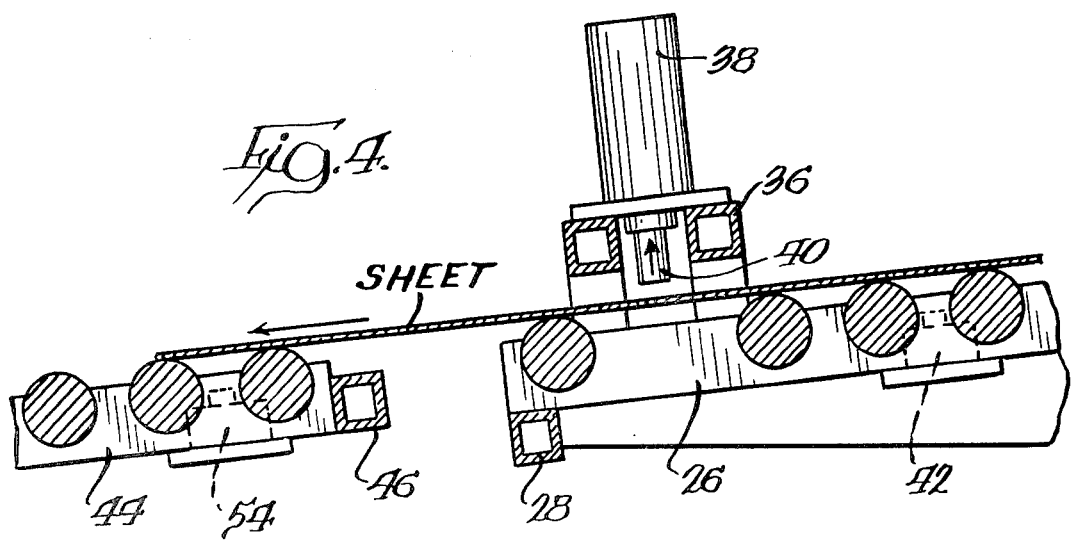

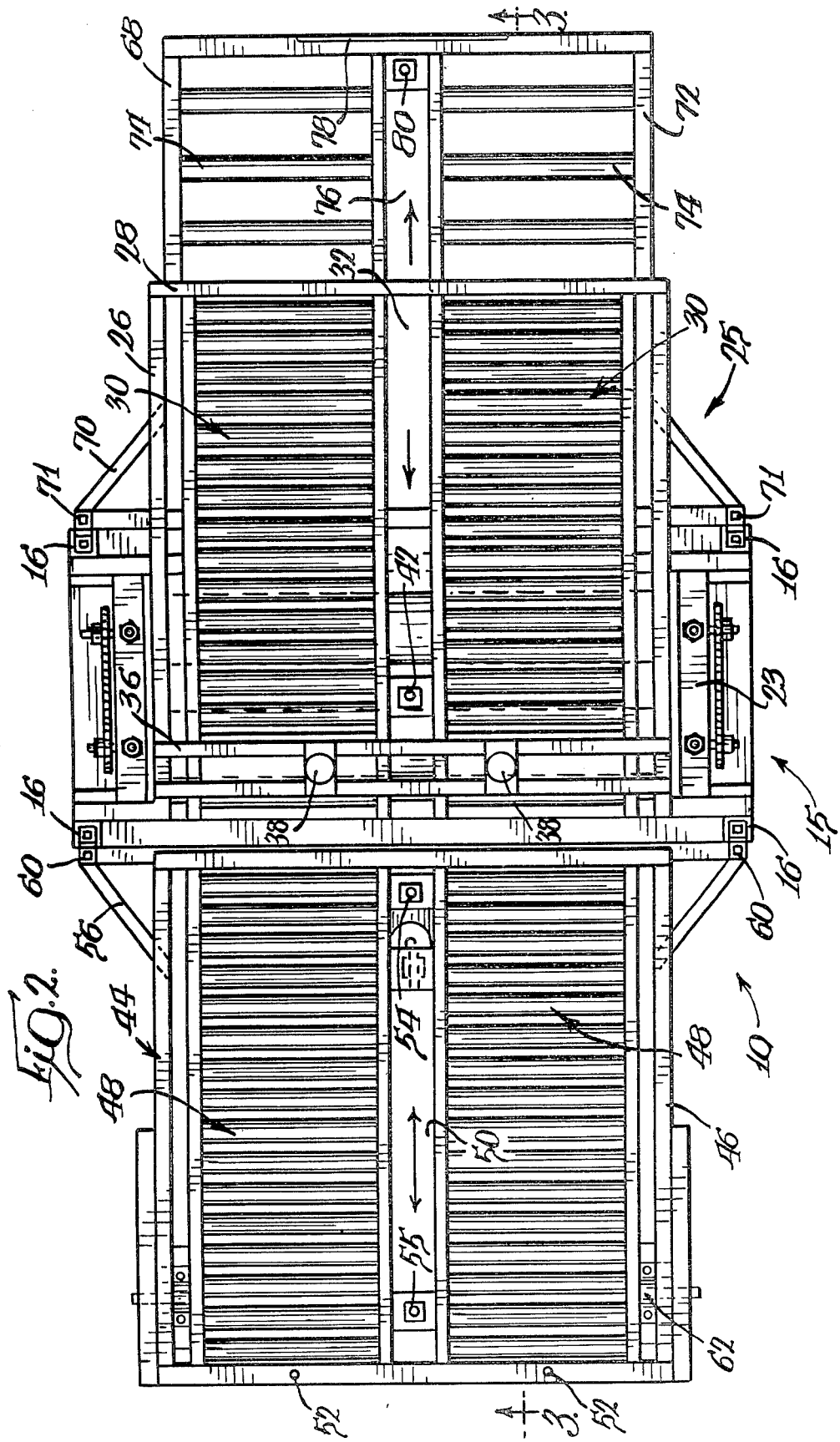

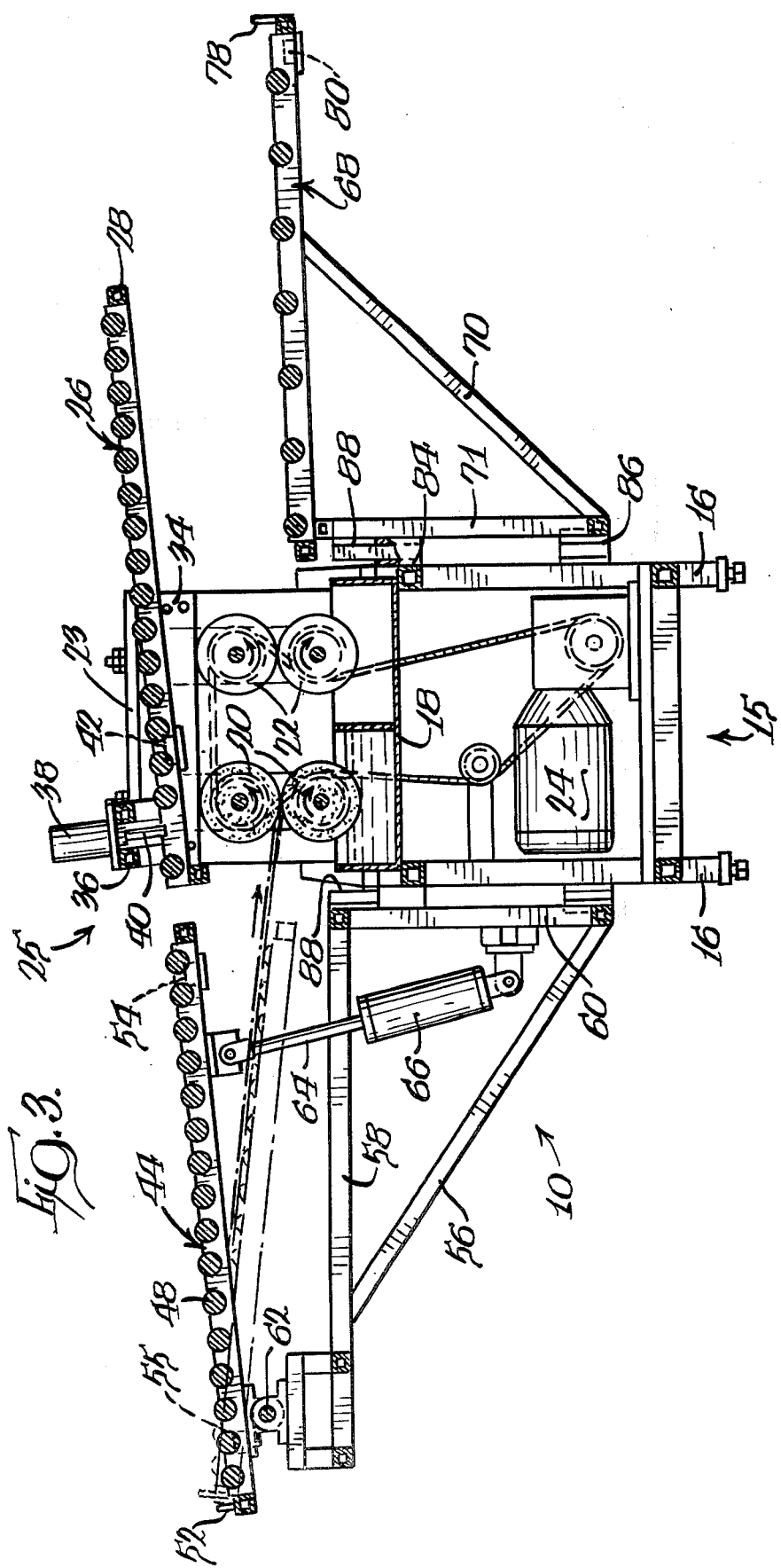

GRAVITY FEED AND RETURN SYSTEM FOR SHEET LUBRICATORS

TECHNICAL FIELD

This invention relates to lubricators employed in various sheet metal operations and, more particularly, to a gravity feed and return system for such lubricators requiring the services of only one operator at a stationary position.

BACKGROUND OF THE INVENTION

Many hollow or dished objects are formed from a sheet of metal by deep drawing or stamping in a press. For example, many parts employed in the aeronautical and automotive industries are made by such processes. In operations of this type, it is necessary to apply a lubricant to the metal sheet to enhance the drawing operation and reduce wear on the tool and die. Sheet lubricators thus are well known and comprise generally driven opposed rollers of felt or the like which apply the lubricant from a circulating supply thereof and driven opposed squeeze rollers, of metal, designed to remove the excess lubricant.

In a typical sheet metal operation of the type under consideration, a supply of blank metal sheets is stacked on a table where an operator is stationed. That operator removes the top sheet from the stack and feeds it into the lubricator positioned nearby. The metal sheet is driven through the lubricator and exits at the opposite end thereof where it must be taken up by a second operator who then places it into the press for the stamping operation. In some instances, the added expense of the second operator and the attendant loss of floor space renders the cost of the entire operation competitively prohibitive.

The type of problem alluded to can be generally characterized as one of material handling efficiency and is by no means unique to the sheet metal art. On the other hand, examination of the known prior art in this field reveals that the proposed solutions invariably are precisely tailored to the particular material and operation involved. Those prior proposals thus have limited applicability and little, if any, utility in the particular sheet metal operations with which the invention is concerned.

Representative examples of prior art conveyor-material handling systems designed to deal with specialized problems are U.S. Pat. Nos. 3,251,450 which teaches apparatus for transferring bakery pans from one conveyor to a second, transverse conveyor; 3,844,402 which teaches a conveyor system with a rotatable carrying plate for depositing fermented dough products; 3,137,396 which teaches an elaborate system for transporting tobacco products; 1,597,961 which teaches an apparatus for delivering empty pallets to a molded brick dumper; 2,795,312 which teaches a mechanism for switching a flow of lapped articles such as newspapers from one conveyor to another; 3,863,912 which teaches a paper document feeder for a copying machine; and 3,789,973 which teaches a multiple endless belt system for feeding highly flexible workpiece sheets into a tool and extracting it therefrom. The unsuitability of those prior art systems for dealing with the particular problems of the character described here will be apparent to those skilled in the art of sheet metal lubricators and metal drawing operations.

Other prior art conveyor-material handling systems are likewise characterized by a variety of disadvantageous features. Thus, for example, U.S. Pat. No. 2,669,263 teaches a mechanism for returning to a worker a board or piece of lumber after the same has been sawed by a rip saw. In that device, the relatively heavy and rigid board is conveyed by driven rollers up an incline to the return station. That conveyor mechanism obviously would be ineffective for the slippery, lubricated, relatively light and flexible sheet with which this invention is concerned. In addition, the patented device employs sprocket wheels and chains which are objectionable for a number of reasons including worker safety.

In U.S. Pat. No. 1,767,574, there is disclosed a wheeled device positionable for catching hot metal plates as they are ejected from a mill. That device includes a complex system with a reversible motor, gears, driven conveyor wheels and a tiltable table for returning the plate to the mill for re-rolling, or conveying it to a stacking station. Again, the patented device is incapable of efficiently and inexpensively returning a lubricated metal sheet to the same operator.

Still another type of conveyor-material handling apparatus is disclosed in U.S. Pat. No. 3,392,813 which comprises an upper, inclined gravity conveyor section for storing a supply of empty tote pans, a lower gravity conveyor section for storing filled tote pans and a connecting gravity conveyor section pivotal between the two storage sections. The pivotal section is retained in the upper aligned position by magnets and pivots to the lower aligned position only after a tote pan positioned thereon has been filled with merchandise, presumably by an operator positioned there. That apparatus is unsuitable for the sheet metal lubricator applications here involved because it depends for its operation on an increase in weight of the conveyed piece.

From the foregoing discussion of the prior art, it is apparent that there exists a need for an inexpensive, simple and positive acting feed and return system for sheet metal lubricators that enables a single, stationary operator to conveniently, efficiently and safely lubricate a sheet and regain the lubricated sheet for placement in the press for the drawing operation.

SUMMARY OF THE INVENTION

The present invention provides a gravity conveyor system which can be readily connected to a conventional sheet lubricator to convert the lubricator for single operator control. The system comprises a first conveyor section attachable to the top of the conventional lubricator and inclined to carry a metal sheet away from the discharge end which faces the operator and toward the entrance end. A second conveyor section is pivotally supported on a framework extending from the entrance end of the lubricator. The second conveyor section is controlled by a pneumatic or hydraulic piston rod and is normally in aligned relationship with the first conveyor section. When a metal sheet is conveyed onto the second conveyor section, the piston-cylinder is activated to draw the section to a downwardly inclined position whereby the sheet feeds by gravity into the grip of the lubricant applicator rollers of the lubricator. The sheet is driven through the lubricator and exits onto a third conveyor section carried on a frame extending from the exit end of the lubricator and toward the operator. The operator has simply to remove the lubricated sheet from the third conveyor section and turn to place the same into the press.

Suitable switches and electrical circuitry are provided for proper sequencing of the various stages of the operation. The switches also act as safety means to insure that no new sequence can begin with a sheet until the preceding lubricated sheet has been completely removed.

The positioning of the gravity conveyor sections is such that their angles of inclination can be very small. Thus, the vertical spacing between the first and third conveyor sections is likewise small. As a result, all manual movements can be comfortably carried out by the operator substantially between waist and shoulder level.

The entire conveyor system can be made for ready detachable connection to a conventional sheet lubricator. The invention thus affords considerable versatility in plant operations and utilization of floor space. At the same time, the invention is of sturdy, durable and maintenance-free construction and simple to operate.

Other features and advantages of the invention will be apparent from the following description and claims and are illustrated in the accompanying drawings which show structure embodying the preferred features of the present invention and the principles thereof.

BRIEF DESCRIPTION OF THE DRAWINGS

FIG. 1 is a diagrammatic view illustrating a typical placement of a single operator with relation to the invention, a supply of metal sheets and the press for forming the finished part;

FIG. 2 is a top plan view of the invention;

FIG. 3 is a vertical sectional view taken on the plane of line 3—3 in FIG. 2; and FIG. 4 is an enlarged sectional detail view.

DETAILED DESCRIPTION OF THE INVENTION

Referring now with greater particularity to the various Figures of the drawings, it will be seen that the reference numeral 10 indicates generally a sheet lubricator with gravity feed and return system embodying the principles of the invention. Assembly 10 comprises a sheet lubricator 15 and a gravity feed and return system 25.

The sheet lubricator 15 is of generally conventional construction and only so much thereof as is necessary for an understanding of the invention will be described. Lubricator 15 thus comprises a rectangular frame having vertical legs 16 which supports a lubricant reservoir 18, a pair of applicator rollers 20, 20, a pair of squeeze rollers 22, 22, support members 23, 23, carrying the rollers, and suitable motor driven pump and drive means 24. In conventional usage, the lubricator 15 is a free standing, self-contained unit requiring one worker to insert a metal sheet into the pinch of the applicator rollers 20 and a second worker to remove the sheet as it is driven out of the applicator by the squeeze rollers 22.

Gravity feed and return system 25 comprises a fixed first gravity conveyor section 26 having a rectangular frame 28 carrying a pair of roller tracks 30, 30, arranged to provide a central longitudinal gap 32 therebetween. The conveyor section 26 is mounted to an upper portion of the lubricator support members 23 by side plates 34 (see FIG. 3) and any suitable connector means, such as bolts (not shown), and such mounting desirably is removable. It will be noted that the first conveyor section 26 projects away from the exit or discharge end of the lubricator 15 and is inclined downwardly toward the entrance end thereof.

A gate bar 36 is mounted transversely of the conveyor section 26 adjacent the downstream end thereof and said frame carries a pair of air cylinders 38, 38, whose rods 40, 40, normally extend down into and provide gates to block travel of the metal sheets over the roller tracks 30. An electrical proximity switch 42 is likewise mounted on the conveyor section 26 and projects upwardly through the gap 32 where it will be actuated by a sheet passing thereover. The operation and sequencing of the gates 40 and switch 42, as well as other switches employed will become apparent as the description proceeds.

Cooperating with the first conveyor section 26 is a second, or direction reversing, gravity conveyor section 44 which is of similar construction to the first conveyor section and comprises a rectangular frame 46 carrying a pair of roller tracks 48 having a longitudinal gap 50 therebetween. Stop members such as 52, 52, are mounted on the downstream end of the frame 46. The frame 46 likewise carries a pair of electrical proximity switches 54 and 55 adjacent the upstream and downstream ends respectively, said switches projecting upwardly in the gap 50 to be actuated by a sheet passing thereover.

The second conveyor section 44 is pivotally mounted on an angle iron frame 56 supported on and extending laterally from the vertical legs 16 of the lubricator 15 at the entrance end thereof. The frame 56 includes horizontal members 58 and vertical members 60, and the conveyor section 44 is pivotally connected thereto by suitable bearing means such as a ball bearing pillow block 62. Adjacent its upstream end, the conveyor section 44 is pivotally connected to a piston rod 64 whose cylinder 66 is connected to the vertical frame members 60. It will thus be seen that the conveyor section 44 is movable between a sheet receiving position in planar alignment with the first conveyor section 26 and a second, discharging position where it angles downwardly toward, and in alignment with, the lubricant applicator rollers 20 as indicated by the broken line showing in FIG. 3 of the drawings.

A third conveyor section 68 is carried by another angle iron frame 70 having vertical members 71 supported on and extending laterally from the vertical legs 16 of the lubricator 15 at the exit end thereof. Conveyor section 68 comprises a rectangular frame 72, a pair roller tracks 74, 74, arranged to provide a central gap 76 therebetween, and an end stop member 78 on the free end thereof. An electrical sensing switch 80 is carried by the conveyor section 68 and projects upwardly through the gap 76 in position to be actuated by a sheet passing thereover.

The entire gravity feed and return system 25 may be readily attached to or disconnected from a sheet lubricator such as 15. In the embodiment illustrated, rectangular tube members such as 84, made of structural steel, are welded to the vertical legs 16 of the sheet lubricator adjacent the tops thereof, and sleeve-like retainers 86 are welded to lower portions of said legs. Complementary structural steel tube members 88 are welded or otherwise attached to the vertical members 60 and 71 of the respective angle iron frames, and said tube members 88 are adapted to be slidably received within the tube members 84 whereupon the retainers 86 cooperate to engage the vertical members 60 and 71 to prevent lateral movement thereof. Other suitable connect-disconnect means may likewise be employed, but the advantages and versatility afforded by the detachable feed and return system will be appreciated by those skilled in the art.

Feed and return system 25 also includes suitable electrical and pneumatic circuitry and connectors (not shown) for operating the various switches and the piston rod-cylinder 64, 66. In the embodiment illustrated and described, switch 80 serves as a master switch to prevent transport of a metal sheet on the first conveyor section 26 past the gates 40 while a lubricated sheet is still on the third conveyor section 68. When the third conveyor section is clear, a sheet on the section 26 actuates switch 42 which actuates the air cylinders 38, raising the rods 40 and permitting the sheet to roll by gravity onto the second conveyor section 44. Switches 54 and 55 are thereupon actuated in tandem, one to actuate the piston rod 64 to pivot the section 44 downwardly, and the other to actuate the piston rod in the reverse direction when the sheet has cleared the section 44. Upon discharge from the lubricator 15, the lubricated sheet actuates switch 80 which, as a safety measure, now prevents another sheet from leaving the first conveyor section 26 until the lubricated sheet is removed.

While the various switches have been described as proximity switches, it will be appreciated that other switching devices and arrangements, such as photoelectric beams or electrical solenoids in place of the air cylinders, could be similarly employed. Furthermore, additional switches could also be added to increase capacity of the invention by permitting a metal sheet to be present on each of the three conveyor sections simultaneously.

Operation and the advantages of the invention may now be best appreciated by reference to FIG. 1 of the drawings. The sheet lubricator assembly 10 is positioned at a point conveniently located near or between a supply of metal sheets and the press for forming the finished parts therefrom. A single worker W is stationed facing the exit or discharge end of the sheet lubricator 15. With a simple turn of the body, the worker lifts a sheet from the supply and places it on the first conveyor section 26. By actuation of the switch 42 and gates 40, the sheet slides by gravity onto the second conveyor section 44. By actuation of the switch 54 the piston rod 64 pivots the second conveyor section 44 until it is inclined downwardly toward the applicator rollers 20 of the lubricator. The sheet thereupon slides by gravity into the lubricator whose rollers draw it from the section 44 thereby actuating the piston rod 64 to cause section 44 to return to its original position. The sheet thereupon exits from the lubricator onto the third conveyor section 68 where actuation of the switch 80 causes de-energization of the circuitry and lowering of the gates 40. The lubricated sheet is now removed by the worker W who, with a simple turn in the opposite direction, places the sheet into the press and then begins to repeat the operation.

It should be noted that the arrangement of conveyor sections and initial transport of the workpiece sheet away from the discharge end of the lubricator advantageously permits very small angles of inclination for the conveyor sections 26 and 44 to be employed as well as relatively small angular travel for the section 44. In this regard, I have found that the angle of inclination of the section 26 from the horizontal can be between about 5 degrees and 10 degrees, and preferably about 6 degrees. vertical spacing between sections 26 and 68 is thus held to a minimum so that a worker can perform all manual operations at comfortable work heights.

While a preferred embodiment has been illustrated and described herein, changes and variations may be made by those skilled in the art without departing from the spirit and scope of the appended claims. The invention is defined by the claims that follow.

What is claimed is:

1. A gravity conveyor system for feeding metal sheets from a worker station to a sheet lubricator having driven rollers and returning the lubricated sheets to the same worker station comprising:
   a first conveyor section mounted on the sheet lubricator above the driven rollers thereof,
   said first conveyor section being inclined downwardly from the discharge end in the direction of the entrance end of the sheet lubricator;
   a second conveyor section mounted from the entrance end of the sheet lubricator and pivotable between a first position in planar alignment with said first conveyor section and a second position inclined downwardly toward the driven rollers of the sheet lubricator for delivering a sheet thereinto;
   means responsive to a sheet passing onto and from said second conveyor section for pivoting said second conveyor section between said first and second positions; and
   a third conveyor section mounted from the discharge end of the sheet lubricator in substantial vertical alignment with said first conveyor section for receiving a sheet exiting from the sheet lubricator.

2. A gravity conveyor system according to claim 1 wherein said means comprises a piston rod-cylinder connected to said second conveyor section and electrical sensing means associated with said second conveyor section for actuating said piston rod-cylinder.

3. A gravity conveyor system according to claim 2 and comprising further a first framework mounted from the sheet lubricator and extending from the entrance end thereof, means pivotally mounting said second conveyor section on said first framework adjacent the downstream end thereof, said piston rod-cylinder being connected between said second conveyor section and said first framework.

4. A gravity conveyor system according to claim 3 and comprising further cooperating connector means on said first framework and the sheet lubricator whereby said first framework is readily attachable to and detachable from the sheet lubricator.

5. A gravity conveyor system according to claim 3 and comprising further a second framework mounted from the sheet lubricator and extending from the discharge end thereof, said third conveyor section being carried on said second framework, and cooperating connector means on said second framework and the sheet lubricator whereby said second framework is readily attachable to and detachable from the sheet lubricator.

6. A gravity conveyor system according to claim 5 and comprising further cooperating connector means on said first conveyor section and the sheet lubricator whereby said first conveyor section is readily attachable to and detachable from the sheet lubricator.

7. A gravity conveyor system according to claim 2 and comprising further gate means on said first conveyor section for barring passage of a metal sheet therefrom and electrical sensing means associated with said first conveyor section and responsive to a sheet passing thereover for raising and lowering said gate means.

8. A gravity conveyor system according to claim 7 and comprising further electrical sensing means associated with said third conveyor section responsive to a sheet positioned thereon to prevent raising of said gate means.

9. A gravity conveyor system according to claim 1 wherein the angle of inclination of said first conveyor section from the horizontal is between 5 degrees and 10 degrees.

10. The gravity conveyor system of claim 9 in which said angle of inclination is substantially 6 degrees.

11. A sheet feed and return system for converting a sheet lubricator for single worker-stationary station operation comprising:
- a first roller gravity conveyor section mounted atop the sheet lubricator and inclining downwardly from the discharge end in the direction of the entrance end of the sheet lubricator;
- gate means on said first conveyor section for barring passage of a sheet therefrom;
- electrical switch means on said first conveyor section responsive to a sheet passing thereover for raising and lowering said gate means;
- a first framework detachably mounted from the sheet lubricator and extending from the entrance end thereof;
- a second roller gravity conveyor section pivotally mounted on said first framework and pivotable between a first position in planar alignment with said first conveyor section and a second position inclined downwardly toward the driven rollers of the sheet lubricator for feeding a sheet thereinto;
- a piston rod-cylinder connected between said second conveyor section and first framework for positively moving said second conveyor section between said first and second positions;
- electrical switch means on said second conveyor section for actuating said piston rod-cylinder responsive to a sheet passing onto and from said second conveyor section;
- a second framework detachably mounted from the sheet lubricator and extending from the discharge end thereof; and
- a third roller gravity conveyor section mounted on said second framework for receiving a sheet exiting from the sheet lubricator,
said third conveyor section being in substantial vertical alignment with said first conveyor section so that a single worker positioned at a station facing the discharge end of the sheet lubricator can manually place a sheet on said first conveyor section and remove a lubricated sheet from said third conveyor section.

12. A sheet feed and return system according to claim 11 and comprising further electrical switch means on said third conveyor section responsive to a sheet positioned thereon for preventing raising of said gate means.

13. The sheet feed and return system of claim 11 in which the angle of inclination of said first conveyor section to the horizontal is about 6 degrees.

* * * * *